United States Patent [19]

Dubeck et al.

[11] 4,057,531

[45] Nov. 8, 1977

[54] FIRE RETARDANT POLYSTYRENE

[75] Inventors: Michael Dubeck, Birmingham; David R. Brackenridge, Royal Oak, both of Mich.

[73] Assignee: Ethyl Corporation, Richmond, Va.

[21] Appl. No.: 764,044

[22] Filed: Jan. 31, 1977

Related U.S. Application Data

[63] Continuation-in-part of Ser. No. 363,789, May 25, 1973, which is a continuation-in-part of Ser. No. 70,922, Sept. 9, 1970, abandoned.

[51] Int. Cl.$^2$ .................................................. C08K 5/05
[52] U.S. Cl. ........................ 260/45.95 R; 260/45.95 L; 260/45.7 R; 260/2.5 FP; 260/2.5 B
[58] Field of Search .................. 260/45.95 R, 45.95 L, 260/2.5 B, 2.5 FP

[56] References Cited

U.S. PATENT DOCUMENTS

| 2,631,168 | 3/1953 | Ross et al. | 260/77.5 AM |
| 3,899,466 | 8/1975 | Dubeck et al. | 260/45.9 RL |
| 3,901,834 | 8/1975 | Brackenridge | 260/45.7 RL |

*Primary Examiner*—V.P. Hoke
*Attorney, Agent, or Firm*—Donald L. Johnson; John F. Sieberth; Robert A. Linn

[57] ABSTRACT

Polystyrene and related polymers are rendered flame retardant by 2,3,5,6-tetrabromo-p-xylene-$\alpha,\alpha'$-diol. Tests of polystyrene containing the diol show a high degree of stability toward ultraviolet radiation.

3 Claims, No Drawings

FIRE RETARDANT POLYSTYRENE

CROSS-REFERENCE TO RELATED APPLICATIONS

This application is a continuation-in-part of application Ser. No. 363,789 filed May 25, 1973, which in turn is a continuation-in-part of abandoned application Ser. No. 70,922 filed Sept. 9, 1970.

BACKGROUND OF THE INVENTION

A variety of flame retardants have been suggested for polystyrene. Decabromobiphenyl oxide is now used commercially. Antimony trioxide can be incorporated in the composition, U.S. Pat. No. 3,075,944, Wick et al. Stability toward ultraviolet radiation is desirable, especially where the polymer-flame retardant composition is utilized in such applications as television cabinets.

Fire retardant usage of the tetrabromoxylene-$\alpha,\alpha'$-diols in various polymeric compositions is taught by our U.S. Pat. No. 3,899,466.

SUMMARY OF THE INVENTION

Styrene polymers are rendered flame retardant by the tetrabromo-$\alpha,\alpha'$-diols and the finished compositions have a high degree of stability toward u.v. light. Preferred embodiments are:

1. A flame retardant polystyrene composition comprising (i) a solid polymer of

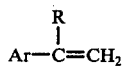

wherein Ar is a benzene or toluene nucleus, and R is —H or —CH$_3$; and (ii) a flame retardant amount of a compound having the formula

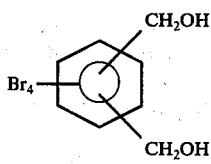

2. A composition of claim 1 wherein said polymer is polystyrene.
3. The composition of claim 2 wherein said compound is 2,3,5,6-tetrabromo-p-xylene-$\alpha,\alpha'$-diol.

DESCRIPTION OF PREFERRED EMBODIMENTS

The polybrominated xylene diol flame retardants of this invention can be incorporated with polystyrene and other polymers made from $\alpha$-olefinic aromatic monomers. Preferably the flame retardants are used with polymers whose flammability is to be reduced below any degree of flame retardancy inherent in the polymer. Accordingly, the flame retardants are ordinarily more useful with polymers that do not contain halogens, or other groups that can confer flame retardancy. On the other hand, our flame retardants can be used with halogenated polymers or other polymers having inherent flame resistance when it is desirable to further reduce their flammability.

Preferably the flame retardants are used with solid polymers; such as those derived from monomers having up to about 12 carbon atoms and the formula

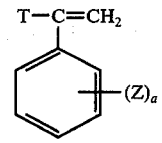

wherein T is hydrogen, $C_1$-$C_4$ alkyl, chlorine or bromine, Z is halogen, $C_1$-$C_4$ alkyl, or vinyl and a is a 0 or a small whole number of from 1 to 5. Preferably, the monomer has up to about 10 carbon atoms and the formula

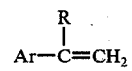

wherein Ar is a benzene nucleus and R is H or methyl. Preferably, the benzene nucleus is derived from benzene or toluene although more highly substituted nuclei can be present. The nucleus may be halogenated with chlorine, bromine or both. Typical monomers are styrene, $\alpha$-methylstyrene, ortho-, meta- and paravinyltoluene, ortho-, meta- and parachlorostyrene and ortho-, meta- and parabromostyrene, divinylbenzene and the like.

Illustrative polymers are the homopolymers of these monomers such as homopolymers of styrene, chlorostyrene, $\alpha$-methylstyrene, etc. Copolymers of $\alpha$-olefinic aromatics such as styrene-$\alpha$-methylstyrene copolymer, styrene-$\alpha$-bromostyrene copolymer and copolymers such as styrene-acrylonitrile copolymers, styrene-methyl methacrylate copolymers, etc.

In a preferred embodiment, solid polymers made from such monomers and having a weight molecular weight of from about 50,000 to about 1,000,000 are used with the flame retardants of this invention. The molecular weight can be determined by a viscosity technique such as that described for polystyrene on pages 212–213 of Vol. 13, *Encyclopedia of Polymer Science and Technology*, Interscience Publishers, a division of John Wiley and Sons (1970).

The flame retardant is added in an effective amount, usually from about 0.1 to about 35 weight percent based on the weight of polymer. Amounts from about 5–25 weight percent are preferred, from about 8 to about 20 weight percent are more preferred.

The flame retardant can be used in conjunction with other known additives if desired. In the prior art, antimony oxide is commonly employed with decabromobiphenyl ether when it is used to fire retard polystyrene, U.S. Pat. No. 3,075,944.

To demonstrate utility, tests were conducted to show fire retardancy by the Underwriters' Laboratories, Inc. UL-94 vertical burning test. The results below were obtained by substantially following the well-known procedure for such testing.

A high impact polystyrene, styron 475U-27 from Dow Chemical Company, was utilized as the polymer to be fire retarded.

The stability to u.v. light was indicated by measurement of the yellowness index (Y.I.).

The yellowness index is measured using a Hunterlab Model D25DP color difference meter and the instructions for the instrument published by the instrument supplier, Hunterlab 9529 Lee Highway, Fairfax, Virginia 22030. The sample employed is part of the same preparation used in the UL-94 test. The higher the number reported below the more yellow the color, the less the Y.I. increase over time the more stable the sample toward u.v. radiation.

The following shows that a V-0 (UL-94) rating is obtainable for Compound (A) at the concentrations in the preceding table.

| Testing Flame Retardants in HIPS | | | | | | | |
|---|---|---|---|---|---|---|---|
| Flame Retardant | Wt % | Sb₂O₃ Wt % | No. of Specimens | Duration of Flame After 1st Ignition | Duration of Flame After 2nd Ignition | Did Specimens Drip Flaming Particles Which Ignite Cotton | UL 94 Rating |
| DBBPO | 10 | 5 | 1 | 0 | 0 | No | |
| | | | 2 | 0 | 0 | No | V-0 |
| (A) | 15 | 3 | 1 | 0 | 0 | No | |
| | | | 2 | 0 | 0 | No | V-0 |
| (A) | 13 | 5 | 1 | 0 | 0 | No | |
| | | | 2 | 0 | 0 | No | V-0 |
| (A) | 12 | 5 | 1 | 0 | 0 | No | |
| | | | 2 | 0 | 0 | No | V-0 |

The above suggests similar results using polystyrene

| Test of Flame-Retarded HDPS-Styron 475U27 Natural No. 7 (Dow) | | | | | | | | | |
|---|---|---|---|---|---|---|---|---|---|
| Flame Retardant | Wt % | Sb₂O₃ Wt % | No. of Specimens | Duration of Flame After 1st Flame Application | Duration of Flame After 2nd Flame Application | Did Specimens Drip Flaming Particles which Ignite Cotton | YI Before UV Exposure | YI After 24 hrs. UV exp | UL-94 Rating |
| Blank | — | | 1 | Burned | | Yes | +14.8 | +18.8 | |
| DBBPO | 8 | 4 | 1 | 30 | 2 | No | | | |
| | | | 2 | 16 | 5 | No | | | 94 V-1 |
| | 8 | 4 | 1 | 18 | 0 | No | | | |
| | | | 2 | 0 | 0 | No | +19.1 | +74.4 | 94 V-1 |
| | 10 | 5 | 1 | 0 | 0 | No | | | |
| | | | 2 | 0 | 0 | No | | | 94 V-0 |
| (A) | 10 | 5 | 1 | 15 | 0 | Yes | +13.8 | +53.7 | |
| | | | 2 | 32 | 0 | Yes | | | 94 V-2 |
| | 15 | 5 | 1 | 0 | 0 | No | | | |
| | | | 2 | 0 | 0 | No | | | 94 V-0 |

In the table, DBBPO refers to a sample of commercial decabromobiphenyl oxide and compound (A) is 2,3,5,6-tetrabromo-p-xylene-α,α'-diol. The table indicates the polystyrene when untreated is highly flammable but is comparatively stable toward u.v. exposure. On the other hand, the decabromobiphenyl oxide sharply reduces flammability, but causes a marked increase in yellowness index after 24 hours indicating instability toward u.v. radiation. With compound (A) the increase in yellowness in much less marked.

For a comparison of yellowness index after 6 and 24 hours, the following data is presented.

| Yellowness Index of HIPS Containing Flame Retardants | | | | |
|---|---|---|---|---|
| | | | Yellowness Index Exposure | |
| Flame Retardants | Wt % | Sb₂O₃ Wt % | 6 hrs | 24 hrs |
| Blank | — | — | +7.5 | +14.7 |
| (A) | 12 | 5 | +16.8 | +42.1 |
| (B) | 10 | 5 | +15.3 | +41.3 |
| DBBPO | 10 | 5 | +39.1 | +68.0 |

In the above table, "DBBPO" and "(A)" have the same meaning as above, and (B) signifies the compound, 2,4,5,6-tetrabromo-m-xylene-α,α'-diol. As shown, Compounds (A) and (B) cause a much less marked yellowness index increase. In the case with Compound (A) this is so when the percentage of (A) employed is higher than the proportion of DBBPO. When the samples tested for yellowness index are exposed to ultraviolet light for a period prior to testing, the exposure is made in general accordance with the method of ASTM 620-57T.

and poly(α-methylstyrene) with from about 1-35 weight percent, 2,3,5,6-hexabromo-p-xylene-α,α'-diol, 3,4,5,6-hexabromo-o-xylene-α,α'-diol, and 2,4,5,6-hexabromo-m-xylene-α,α'-diol. Similar results are obtained when the polybrominated xylene diol is admixed in the same concentration range with poly(divinylbenzene), poly(o-vinyltoluene), poly(p-vinyltoluene) having a weight average molecular within the range of 50,000–1,000,000.

Likewise, the tetrabromoxylene-α,α'-diols are useful in fire retarding expandable styrene polymer compositions. The fire retardants of this invention can be added to the polymeric mixture by any means available to a skilled practitioner. The fire retardant may be added to styrene beads by a process which comprises dispersing the fire retardant on the surface of the bead as set forth in U.S. Pat. No. 3,819,547.

The fire retardants of this invention may be used with synergistic amounts of organic peroxides which are well known for use in fire retarding polymers made from vinyl aromatic monomers such as styrene, isopropyl styrene, tert-butyl styrene, and the like.

The tetrabromoxylene-α,α'-diols are preparable as shown in U.S. Pat. No. 3,899,466.

We claim:
1. A flame retardant polystyrene composition comprising (i) a solid polymer of

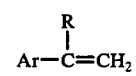

wherein Ar is a benzene or toluene nucleus, and R is —H or —CH₃; and (ii) a flame retardant amount of a compound having the formula
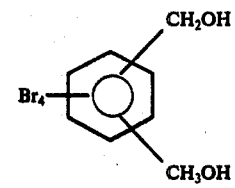
2. A composition of claim 1 wherein said polymer is polystyrene.
3. The composition of claim 2 wherein said compound is 2,3,5,6-tetrabromo-p-xylene-α,α'-diol.
* * * * *